United States Patent
Grigoryev (10) Patent No.: US 9,191,287 B1
(45) Date of Patent: Nov. 17, 2015

(54) SYSTEM AND METHOD FOR LINKING MULTIPLE DEVICES INTO A SINGLE PROFILE WHEN MAKING ONLINE PURCHASES

(71) Applicant: IP Research LLC, Moorhead, MN (US)

(72) Inventor: Viacheslav Grigoryev, St. Petersburg (RU)

(73) Assignee: IP RESEARCH LLC, Moorhead, MN (US)

( * ) Notice: Subject to any disclaimer, the term of this patent is extended or adjusted under 35 U.S.C. 154(b) by 0 days.

(21) Appl. No.: 14/269,682

(22) Filed: May 5, 2014

(51) Int. Cl.
*G06F 15/173* (2006.01)
*H04L 12/26* (2006.01)
*H04L 29/06* (2006.01)
*G06Q 30/06* (2012.01)

(52) U.S. Cl.
CPC ............ *H04L 43/04* (2013.01); *G06Q 30/0601* (2013.01); *H04L 63/08* (2013.01); *H04L 63/20* (2013.01); *H04L 63/306* (2013.01)

(58) Field of Classification Search
None
See application file for complete search history.

(56) References Cited

U.S. PATENT DOCUMENTS

| | | | |
|---|---|---|---|
| 6,553,375 B1 * | 4/2003 | Huang et al. | 1/1 |
| 6,954,735 B1 | 10/2005 | Djupsjobacka et al. | |
| 7,657,489 B2 | 2/2010 | Stambaugh | |
| 8,385,896 B2 | 2/2013 | Proctor et al. | |
| 2009/0119183 A1 * | 5/2009 | Azimi et al. | 705/26 |
| 2010/0250937 A1 * | 9/2010 | Blomquist et al. | 713/170 |
| 2011/0225640 A1 * | 9/2011 | Ganapathy et al. | 726/8 |
| 2012/0036552 A1 * | 2/2012 | Dare et al. | 726/1 |
| 2012/0079126 A1 * | 3/2012 | Evans et al. | 709/230 |
| 2012/0144464 A1 * | 6/2012 | Fakhrai et al. | 726/6 |
| 2014/0351370 A1 * | 11/2014 | Ashley et al. | 709/217 |

* cited by examiner

*Primary Examiner* — Thomas Dailey
(74) *Attorney, Agent, or Firm* — Arent Fox LLP; Michael Fainberg (57) ABSTRACT

Disclosed are systems, methods, and computer program products for simplifying the use of an online service by linking different devices into a single profile when making online purchases. An example method comprises determining that the user has begun working with the online service; determining the device that the user is employing to work with the online service; determining whether the device is new or not by checking a user profile; when the device was not determined as being known in the user profile, adding the device to a user profile associated with the user; and downloading all necessary data from the user profile to the online service.

15 Claims, 6 Drawing Sheets

SYSTEM AND METHOD FOR LINKING MULTIPLE DEVICES INTO A SINGLE PROFILE WHEN MAKING ONLINE PURCHASES

TECHNICAL FIELD

The disclosure relates to the filed of e-commerce, more specifically, to systems, methods and computer program products for linking different devices into a single profile when making online purchases.

BACKGROUND

Online purchases have become very common due to a number of benefits as compared to ordinary purchases—the buyer does not have to drive to the store, while the store itself can save on rent, which has a favorable impact on the end price.

The growth in popularity of online purchases has resulted in services for Internet purchases appearing also on mobile platforms, such as iOS and Android. At present, it is not very difficult to purchase a desired item from a notebook, a smartphone or a tablet.

It should be noted that different devices have different suitability for making online purchases. For example, with a notebook or stationary computer it is possible to familiarize oneself more fully with the future purchase, since the larger screen dimensions and the use of a windows interface as in the Windows or Mac OS operating systems), as well as the high operating speed let one do so without problem. At the same time, with a tablet one can do practically the same thing, while still remaining quite mobile, for example, while in transit or while taking a stroll. And with a smartphone one can make use of cellular communications to discuss possible pluses and minuses of a future purchase with a consultant.

Another problem has arisen at present, and it is related to the fact that the user may have more than one device. For example, the user has seen a new type of product from advertising on his smartphone, that same evening he uses his notebook to study the product in detail, and on the next day he makes the purchase using a tablet while on the way to work. But in this case the user is forced each time to go through the procedure of selecting the product again prior to its subsequent purchase. From the standpoint of the online service, it remains unclear which criteria the customer has used to find the product (reviews, functions supported, price, and so on), what other products he has looked at, what kind of technical reviews he has read, or which criteria he used to select the store (quality, speed of delivery, price).

Thus, there exists an unmet need in the art for a system to link all the user's devices into a single profile to keep current all the information requests of the user, including those involving online purchases.

SUMMARY

Disclosed are systems, methods, and computer program products for simplifying the use of an online service by linking different devices into a single profile when making online purchases. According to an aspect, an example method comprises determining that the user has begun working with the online service; determining the device that the user is employing to work with the online service; determining whether the device is new or not by checking a user profile; when the device was not determined as being known in the user profile, adding the device to a user profile associated with the user; and downloading all necessary data from the user profile to the online service.

In another aspect, the determination that the user has begun working with the online service may be facilitated by at least one of: monitoring of network connections and installing of a plug-in in an application for working with the online service.

In another aspect, the user profile may include at least one of activity on the Internet, processed data involving the user's activity on the Internet presented in systematized form, and the user's actions on the online service.

In another aspect, the device may be determined based on information on a configuration of the device, including at least one of an operating system, installed applications, and hardware capabilities.

In another aspect, the determination of whether the device is new or not may be used to indicate that the device is absent from the user profile.

In another aspect, the necessary data may include at least one of: cookies, session status, data from Flash information repositories, data from Silverlight information repositories.

According to another aspect, an example system for a user to work with an online service using more than one device comprises an agent installed on the device and a referencing service. The agent may be configured to connect to a referencing service, determine that the user has begun working with the online service, and determine the device that the user is employing to work with the online service. The referencing service may be configured to connect to the online service, determine whether a device is new or not by checking a user profile, when the device was not determined as being known in the user profile, add the device to a user profile associated with the user, and download all necessary data from the user's profile to the online service.

According to yet another aspect, a computer program product, which is stored on a non-transitory computer readable medium, for a user to work with an online service using more than one device, includes computer executable instructions for determining that the user has begun working with the online service; determining the device that the user is employing to work with the online service; determining whether the device is new or not by checking a user profile; when the device was not determined as being known in the user profile, adding the device to a user profile associated with the user; and downloading all necessary data from the user profile to the online service.

The above simplified summary of example aspect(s) serves to provide a basic understanding of the invention. This summary is not an extensive overview of all contemplated aspects of the invention, and is intended to neither identify key or critical elements of all aspects nor delineate the scope of any or all aspects. Its sole purpose is to present one or more aspects in a simplified form as a prelude to the more detailed description of the invention that follows. To the accomplishment of the foregoing, the one or more aspects comprise the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects are described herein in the context of a system, method, and computer program product for linking different devices into a single profile when making online purchases. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
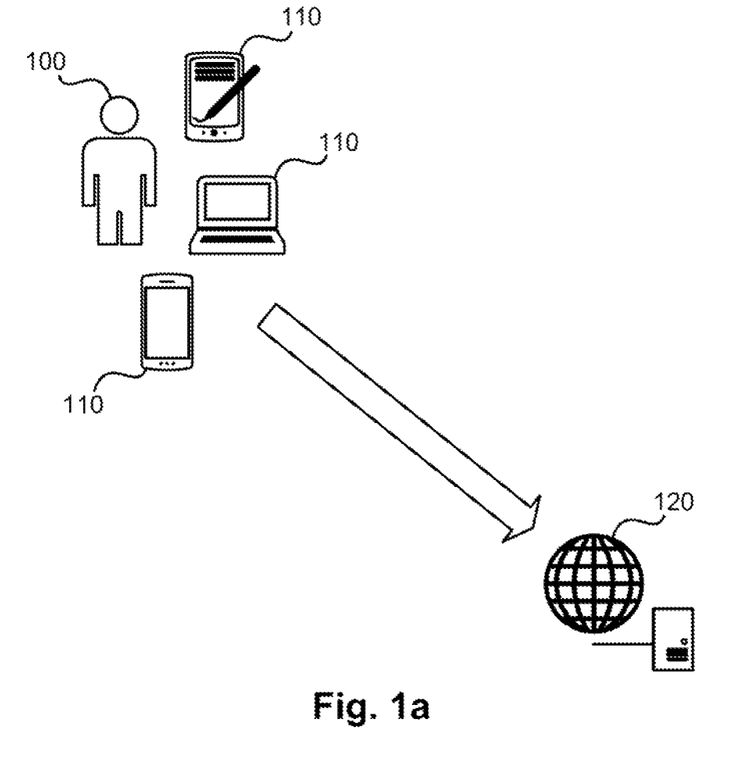
FIG. 1a is a diagram illustrating an example aspect of a system for making online purchases.

FIG. 1*a* is a diagram illustrating an example aspect of a system for making online purchases. The user 100 may employ one or more of his devices 110, such as a smartphone, a tablet, a notebook or a personal computer, for the interaction with an online service 120 in order to purchase goods or a service. If the user employs more than one device and works actively with online services 120, he may have problems with selecting and ordering goods if he is working with more than one device. The services 120 may support user authorization and allow one to save a history of goods selection or purchases, but they may not able to save a current session in the event of a purchase from more than one device. Furthermore, another problem is the fact that the user 100 may employ one device 110 to search for a needed item and store via the Internet, using one of the search engines (such as Google or Bing), but the history of visiting sites will not be saved on another device 110 and the user will either have to repeat the search process all over or save the references of interest to him.

Figure 1B:
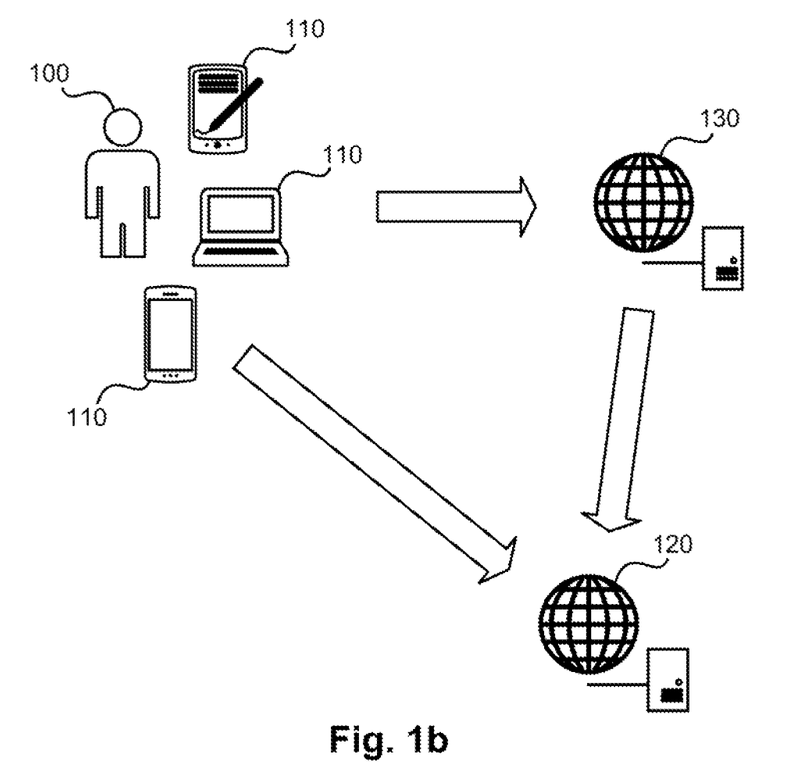
FIG. 1*b* is a diagram illustrating an example aspect of a system for linking different devices into a single profile when making online purchases.

FIG. 1*b* is a diagram illustrating an example aspect of a system for linking different devices into a single profile when making online purchases. To solve the aforementioned problems, a referencing service 130 may be added to the system, which links the device 110 to the user 100, forming a unified profile of the user 100. This profile may be transmitted in whole or in part to the service 120. By using this profile at the service side 120, it becomes possible to link all activity of the user 100 at the service side 120 regardless of which device 110 the user is employing.

Figure 2:
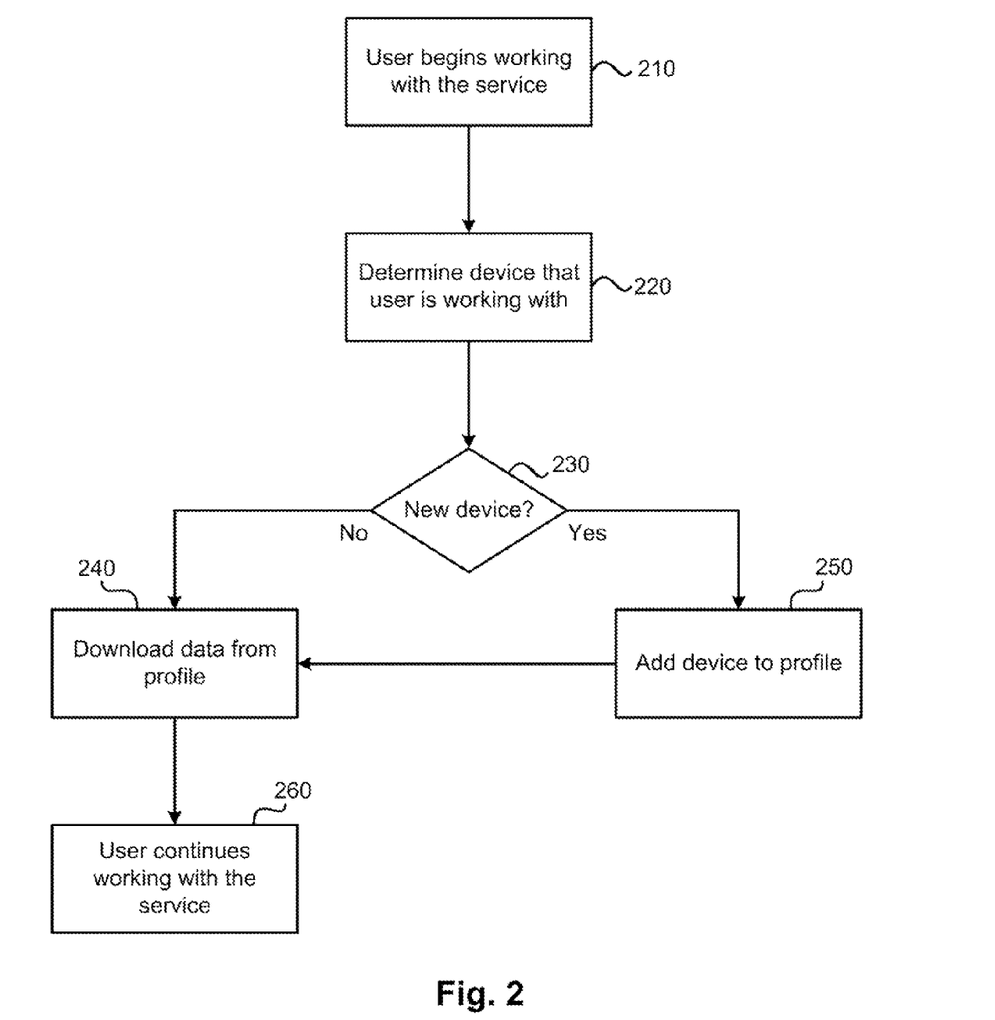
FIG. 2 is a flow diagram illustrating an example method for linking different devices into a single profile when making online purchases.

FIG. 2 is a flow diagram illustrating an example method for linking different devices into a single profile when making online purchases. In step 210, the user 100 may begin working with the service 120. In step 220 there may be a determination of the device which the user is employing to work with the service 120. The determination may be done either with the aid of a local agent on the device 120 or with the aid of the referencing service 130. In step 230 it may be determined whether the device is new or not. If the device was not determined as being known in the user's profile, it may be added to the profile in step 250, after which in step 240 all necessary data from the profile may be downloaded to the service 120. In the last step 260, the user 100 may continue working with the service 120 such that no differences will be noticed when working from different devices 110.

Figure 3:
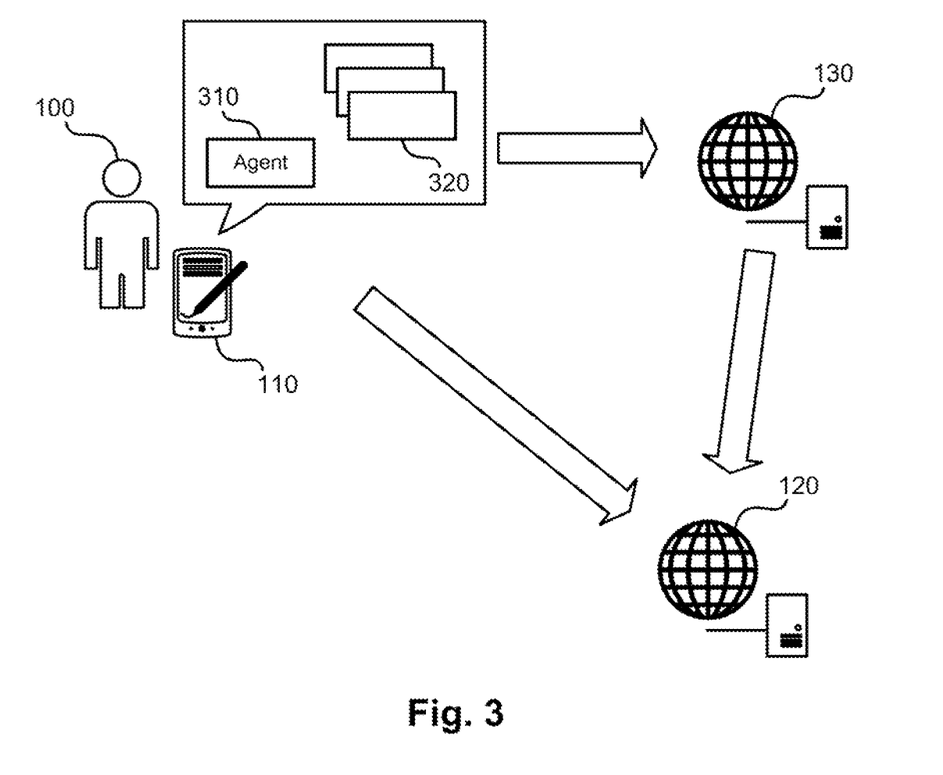
FIG. 3 is a diagram illustrating an example aspect of a system for linking different devices into a single profile when making online purchases.

FIG. 3 is a diagram illustrating an example aspect of a system for linking different devices into a single profile when making online purchases. Let us consider more closely the scheme for determining the user and the device. According to one aspect, as shown in FIG. 3, there may be installed on one of the devices 110 an agent 310 that may track applications 320 being used to access and work with an online service 120. The application 320 may be a browser (such as Google Chrome) or a specialized application (Yandex Market). The applications may be tracked by one of the following approaches: monitoring of network connections (to determine the establishing of a network connection between the application 320 and the service 120), installing of a plug-in in the application 320 (such as a plug-in in a browser) to obtain messages on the exchange of information with the service 120, or replacing the application 320 by the agent 310 (for example, having created one's own browser in the form of an agent 310).

After it has been determined with the aid of the agent that the user 100 is working with a service 120, information may be sent to the referencing service 130, which makes it possible to identify both the user 100 and the device 110. An example of such user information may be the following:

email (can be identified by the presence of the character "@" and a second-level domain);
  a social network account;
  a telephone number;
  first and last name;
  biometric parameters from corresponding input devices (e.g., retinal, fingerprint, hand geometry, facial thermogram, voice parameters)

User identification methods may also be used that are probabilistic in nature and cannot with certainty pertain to a single user, but such methods may be used with high probability for noncritical operations: using the fact of connecting to various often-used sites such as youtube.com, mail.yandex.ru and so on), it is determined that a certain login is used to go to these sites, which can identify the user; use of the history of user actions on a device that are repeated rather often and that characterize a particular user.

The referencing service 130 may also save the user's profile, which may be supplemented in accordance with certain actions of the user, such as activity on the Internet, including the following:

sites visited;
  itineraries (such as how the user moves from one site to another);
  content downloaded;
  search requests.

On the basis of this information, an initial profile may be formed for the user, which may contain processed data presented in a systematized form, such as:

categories of interest with corresponding weights (for example, if the user often visits lenta.ru, vesti.ru, vz.ru and other news sites, he has a high coefficient in the category NEWS, but he seldom visits sites with musical content, and so the category MUSICAL_CONTENT has a low coefficient);

categories of downloaded content;

categories of sent content.

To protect the privacy of such information, a hash function may be used' for such data (for example, MD5 or SHA256).

The profile of the user 100 may also contain information that characterizes actions of the user 100 on the service 120, such as:

purchases made on the service 120;

page visiting map on the service 120;

length of visiting certain pages on the service 120 and others.

Such information may be used by the service 120 to personify the service site 120 for a particular user 100.

The following data may be used to determine the device:

the link between the IP address and the MAC address information on the device configuration, including the operating system and installed applications as well as hardware capabilities (CPU, GPU, primary storage medium and so on)

After the user and the device have been determined, the referencing service 130 may send information to the service 120 about the user 100 and his device 110 in the form of certain compressed information about his profile. For example, this may be the login and password for the service 120, or other information that enables an identification of the user 100 on the web site:

cookies, which enable saving the status of the ession of the user 100 when working with the service 120;

information repositories using such technologies as Flash or Silverlight;

using the API of the service 120 (when present) also makes it possible to send necessary data to the service 120 from the referencing service 130.

Thus, the referencing service 130 may act as a proxy server in the dealings between the user 100 and the service 120, adding information that enables a more complete identification of the user 100, including all of his recent activity.

EXAMPLE NO. 1

A user 100 may employ his smartphone 110 to access an online store 120. While working with the service 120 the user may enter his login and password, after which he may spend some time in searches for a needed item and select several types of technical equipment of interest to him (the service 120 in the example is taken to be an online electronics store). After this, the user's battery on his smartphone 110 may become discharged and he may stop working with the service 120. During this process, an agent 310 may send the necessary information about the user to the referencing service 130: the entering of the login and password, the cookies saved on the smartphone 320, the session identifier. After the user again goes to the service 120 from his notebook 110, the referencing service 130 may receive information from another agent installed on the aforementioned notebook that the user has continued working with the service 120. The session identifier and saved cookies may be loaded into the browser 320 on the notebook 320 and an authorization may also be performed. To the user 100, the service may have the same appearance as if he were continuing to work from his smartphone 110, for example, a shopping basket with a selected item or a saved search history on the service 120.

Figure 4:
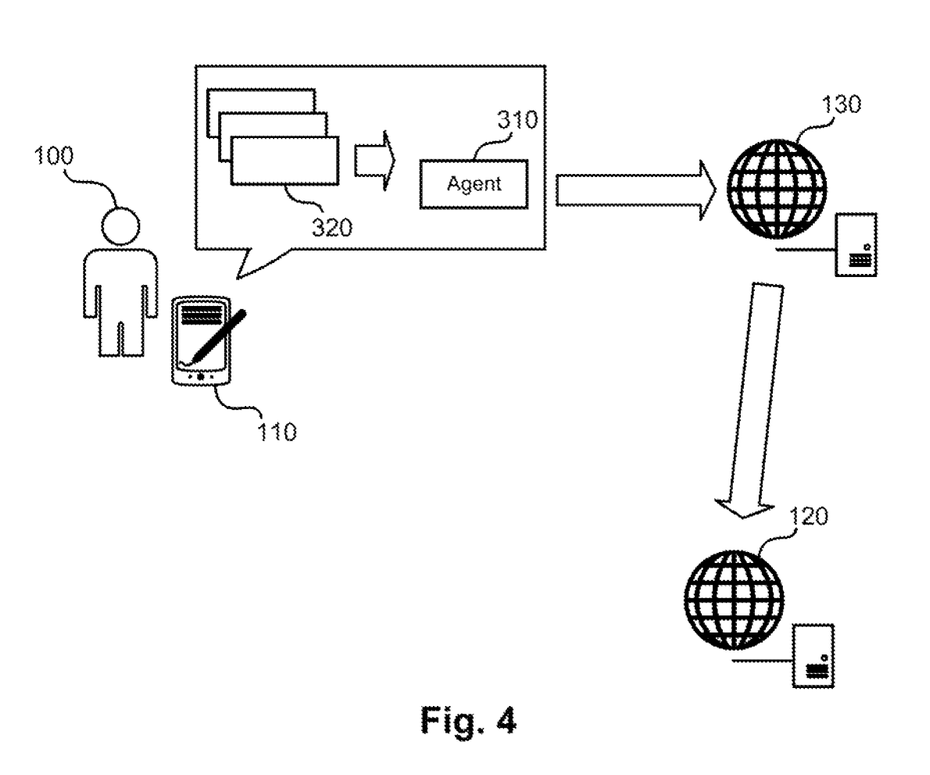
FIG. 4 is a diagram illustrating an example aspect of a system for linking different devices into a single profile when making online purchases.

FIG. 4 is a diagram illustrating an example aspect of a system for linking different devices into a single profile when making online purchases. This example aspects may involve involving the interception of calls from applications 320 of the user 100 to the service 120. This aspect may be implemented with the aid of an agent 310 that works as a proxy server on the device 110. The implementing of a proxy server in the present case makes it possible to selectively intercept only the connections that are addressed to the service 120, while all other connections work the same as before the agent 310 was installed.

EXAMPLE NO. 2

A user 100 may employ a new device 110 (such as a notebook) to access a service 120. After the first access and with the consent of the user 100, an agent 310 may be installed on the device 110, which may work as a proxy server for all connections to the service 120. Also during the first access, the agent 310 may gather information about the device 110 and the user 100 to form a profile. After the profile has been formed, it may be compared against a database of known profiles of devices and users at the referencing service 130. If a match is found between the profiles of devices and users, the referencing service 130 may download to the service 120 all necessary information on the last actions of the user 100 on the service 120—such as the last purchases or pages of merchandise viewed.

An example of a profile is presented in table No. 1 below.

TABLE NO. 1

| Profile | User's profile | Device profile | Device profile | Device profile |
|---|---|---|---|---|
| No. 1 | User No. 1 | Device profile No. 1 | Device profile No. 12 | |
| No. 2 | User No. 3 | Device profile No. 6 | Device profile No. 17 | |
| No. 3 | User No. 4 | Device profile No. 1 | | |
| | User No. 7 | Device profile No. 52 | Device profile No. 32 | Device profile No. 9 |

According to table No. 1, upon identification of user No. 1 there may be a check of the profiles of devices No. 1 and No. 12, which the user No. 1 employed when working with the service 120. If the profile of the device 110 matches any of the device profiles No. 1 and No. 12, all the settings of the given user with regard to his recent actions on the site, purchases made, and so on, may be downloaded at the service 120. The downloading may be either local, or it may be done either from the device 110 (from the agent 310) or from the referencing service 130. It may also be noted that in certain cases the device profiles may coincide for different user's profiles (for example, user No. 4 and user No. 1 have devices with an identical profile)—this may be due to the fact that several users may work on the same computer. Furthermore, a situation is possible where an identical profile is downloaded for different users—for example, in cases when users have identical behavior patterns on the service 120, but have different devices and distinguishing personalized information (such as login and password).

The adding of new device profiles to a user's profile is possible in cases where the user is precisely identified (i.e., his profile is confirmed). Devices may be added either automatically, with recording of their profiles at the referencing service 130, or with consent of the user 100, when the user is adding a device 110 to his profile manually.

Figure 5:
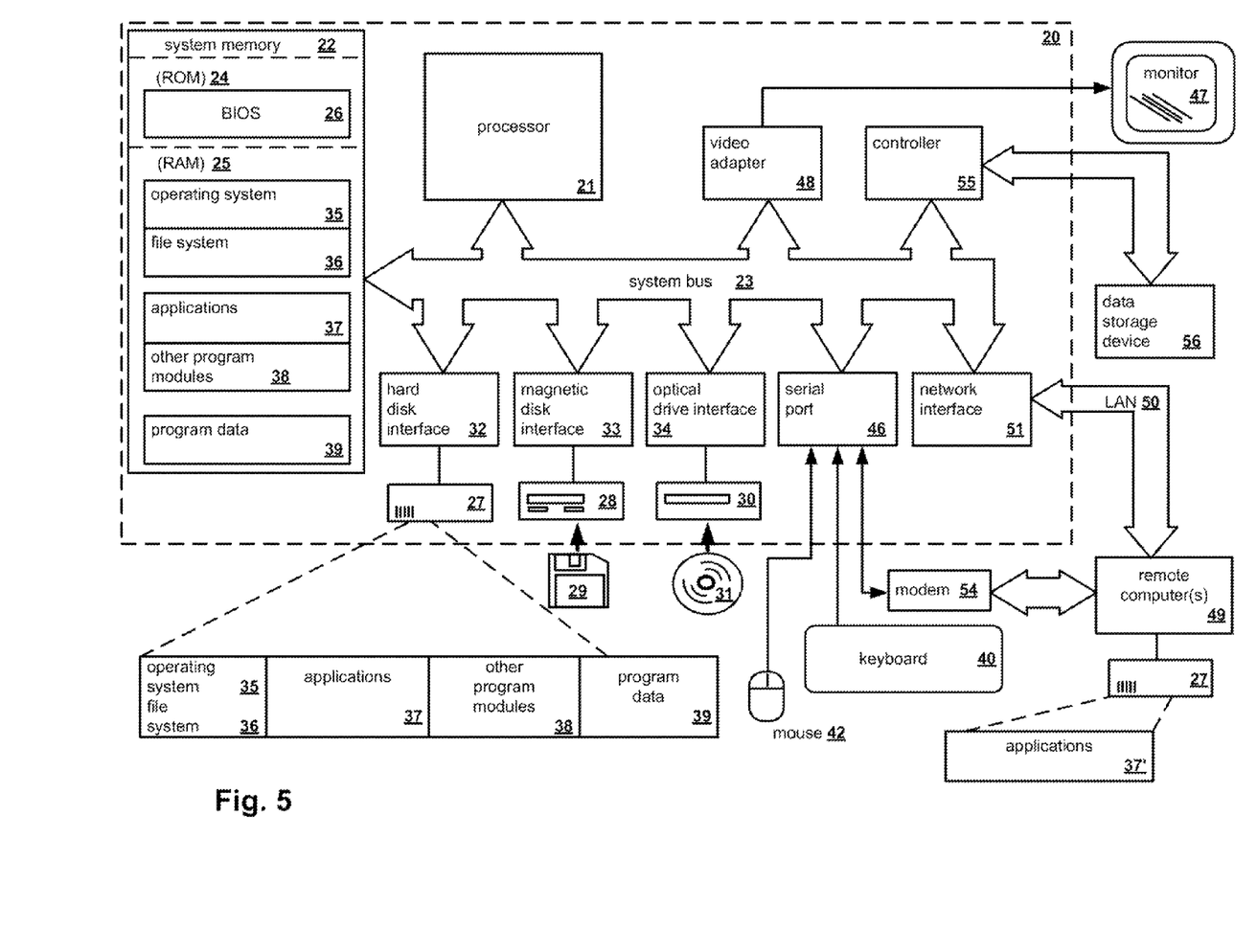
FIG. 5 is a diagram illustrating an example aspect of a general-purpose computer system on which are implemented the systems and methods for linking different devices into a single profile when making online purchases in accordance with aspects of the invention.

FIG. 5 is a diagram illustrating an example aspect of a general-purpose computer system on which are implemented the systems and methods for linking different devices into a single profile when making online purchases in accordance with aspects of the invention.

Specifically, FIG. 5 shows an example of a general-purpose computer system (which can be a personal computer or a server) 20, containing a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory contains permanent memory (ROM) 24 and random-access memory (RAM) 25. The basic input/output system (BIOS) 26 contains the basic procedures ensuring the transfer of information between elements of the personal computer 20, such as those at the time of loading the operating system with the use of the ROM 24.

The personal computer 20, in turn, contains a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent means of storage of computer instructions, data structures, program modules and other data of the personal computer 20.

The present specification reveals the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by means of input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 5. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other means of providing communications with a wide-area computer network such as the Internet. The modem 54, which is an internal or external device, is connected to the system bus 23 by means of a serial port 46. It should be noted that the network connections are only examples and need not depict the exact configuration of the network, i.e., in reality there are other ways of establishing a connection of one computer to another by technical communication means.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for a user to interact with a website using more than one device, the method comprising:
   determining, by a reference service running on a hardware processor of a network server, using a plug-in installed in an application on a first device of the user and operable to communicate with the reference service, that the first device is interacting with the website;
   receiving, by the reference service, from the plug-in on the first device, identification information of the first device of the user;
   determining, by the reference service, whether the first device is new or known to the reference service by reviewing a user profile, stored in a database, that identifies one or more known devices associated with the user;
   when the first device is determined to be new to the reference service, adding the identification information of the first device to the user profile stored in the database as being associated with the user and storing in the database session information relating to the interaction between the first device and the website; and
   when a second device, which is a known device associated with the user, accesses the website, automatically downloading from the user profile to a server of the website the identification and session information, such that the second device can interact with the website using the session information.

2. The method of claim 1, wherein the user profile includes at least one of: user's activity on the Internet, processed data involving the user's activity on the Internet presented in systematized form, and the user's actions on the website.

3. The method of claim 1, wherein the identification information of the first device is determined based on information on a configuration of the device, including at least one of an operating system, installed applications, and hardware capabilities.

4. The method of claim 1, wherein the determination of whether the first device is new or known is based on whether the device is absent from the user profile.

5. The method of claim 1, wherein the session information relating to the interaction between the first device and the website includes at least one of: cookies, session status, data from Flash information repositories, data from Silverlight information repositories.

6. A system for a user to interact with a website using more than one device, the system comprising:
   a hardware processor of a network server running a reference service, wherein the reference service is configured to:
      determine, using a plug-in installed in an application on a first device of the user and operable to communicate with the reference service, that the first device is interacting with the website;
      receive from the plug-in on the first device, identification information of the first device of the user;
      determine whether the first device is new or known to the reference service by reviewing a user profile, stored in a database, that identifies one or more known devices associated with the user,
      when the first device is determined to be new to the reference service, add the identification information of the first device to the user profile stored in the database as being associated with the user and store in the database session information relating to the interaction between the first device and the website, and
      when a second device, which is a known device associated with the user, accesses the website, automatically download from the user profile to a server of the website the identification and session information, such that the second device can interact with the website using the session information.

7. The system of claim 6, wherein the user profile includes at least one of: user's activity on the Internet, processed data involving the user's activity on the Internet presented in systematized form, and the user's actions on the website.

8. The system of claim 6, wherein the identification information of the first device is determined based on information on a configuration of the device, including at least one of an operating system, installed applications, and hardware capabilities.

9. The system of claim 6, wherein the determination of whether the first device is new or known is based on whether the device is absent from the user profile.

10. The system of claim 6, wherein the session information relating to the interaction between the first device and the website includes at least one of: cookies, session status, data from Flash information repositories, data from Silverlight information repositories.

11. A non-transitory computer readable medium storing computer executable instructions for a user to interact with a website using more than one device, including instructions for:
   determining, by a reference service running on a hardware processor of a network server, using a plug-in installed in an application on a first device of the user and operable to communicate with the reference service, that the first device is interacting with the website;
   receiving, by the reference service, from the plug-in on the first device, identification information of the first device of the user;
   determining, by the reference service, whether the first device is new or known to the reference service by reviewing a user profile, stored in a database, that identifies one or more known devices associated with the user;
   when the first device is determined to be new to the reference service, adding the identification information of the first device to the user profile stored in the database as being associated with the user and storing in the database session information relating to the interaction between the first device and the website; and
   when a second device, which is a known device associated with the user, accesses the website, automatically downloading from the user profile to a server of the website the identification and session information, such that the second device can interact with the website using the session information.

12. The computer readable medium 11, wherein the user profile includes at least one of: user's activity on the Internet, processed data involving the user's activity on the Internet presented in systematized form, and the user's actions on the website.

13. The computer readable medium 11, wherein the identification information of the first device is determined based on information on a configuration of the device, including at least one of an operating system, installed applications, and hardware capabilities.

14. The computer readable medium 11, wherein the determination of whether the first device is new or known is based on whether the device is absent from the user profile.

15. The computer readable medium 11, wherein the session information relating to the interaction between the first device and the website includes at least one of: cookies, session status, data from Flash information repositories, data from Silverlight information repositories.

\* \* \* \* \*